(12) United States Patent
Kurian

(10) Patent No.: US 10,828,926 B2
(45) Date of Patent: Nov. 10, 2020

(54) SMART PROCESSING DEVICE WITH SELECTIVE CONFIGURATION FUNCTION CONTROL

(71) Applicant: Bank of America Corporation, Charlotte, NC (US)

(72) Inventor: Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 62 days.

(21) Appl. No.: 16/210,391

(22) Filed: Dec. 5, 2018

(65) Prior Publication Data
US 2020/0180342 A1 Jun. 11, 2020

(51) Int. Cl.
*G06Q 20/34* (2012.01)
*B42D 25/305* (2014.01)
*B42D 25/21* (2014.01)
*B42D 25/22* (2014.01)

(52) U.S. Cl.
CPC .......... *B42D 25/305* (2014.10); *B42D 25/21* (2014.10); *B42D 25/22* (2014.10); *G06Q 20/357* (2013.01); *G06Q 20/3574* (2013.01)

(58) Field of Classification Search
CPC ......... G06Q 20/34; G07F 7/08; G07F 7/0806; G07F 7/0813; G07F 7/0833; G06K 19/067; G06K 19/0677; G06K 19/07; G06K 19/0723; G06K 19/077; G06K 19/07701; G06K 19/07716; G06K 19/0772; G06K 19/07737
See application file for complete search history.

(56) References Cited

U.S. PATENT DOCUMENTS

| | | | | |
|---|---|---|---|---|
| 4,562,342 A | * | 12/1985 | Solo | G07F 7/10 235/380 |
| 5,049,728 A | * | 9/1991 | Rovin | G06K 19/072 235/487 |
| 5,326,964 A | | 7/1994 | Risser | |
| 5,538,291 A | | 7/1996 | Gustafson | |
| 6,105,873 A | * | 8/2000 | Jeger | G06K 19/0719 235/487 |

(Continued)

*Primary Examiner* — Thien M Le
*Assistant Examiner* — April A Taylor
(74) *Attorney, Agent, or Firm* — Banner & Witcoff, Ltd.; Michael A. Springs

(57) ABSTRACT

Smart processing devices and systems for controlling functionality of smart processing devices are provided. In some examples, a smart processing device may include a central segment and a plurality of removable segments. The removable segments may be connected to the central segment in a plurality of different configurations. In some examples, each configuration may enable or disable functionality associated with the smart processing device. Further, a system may receive data associated with a current physical configuration of a smart processing device. The current physical configuration data may be compared to pre-stored configuration data in order to identify one or more functions to be enabled or disabled for the smart processing device. The system, computing platform, or the like, may generate an instruction, command or signal enabling or disabling functionality and may transmit the signal to the smart processing device for execution and control of functions provided by the smart processing device.

17 Claims, 14 Drawing Sheets

(56) References Cited

U.S. PATENT DOCUMENTS

| | | | | |
|---|---|---|---|---|
| 7,793,851 B2* | 9/2010 | Mullen | ................ | G06K 19/077 |
| | | | | 235/380 |
| 9,495,852 B1 | 11/2016 | Colby | | |
| 9,665,747 B1* | 5/2017 | Ogram | ............. | G06K 19/06187 |
| 10,026,077 B2* | 7/2018 | Hosny | .................. | G06K 19/072 |
| 2011/0062242 A1* | 3/2011 | Cowcher | .......... | G06K 19/07327 |
| | | | | 235/492 |
| 2014/0284383 A1* | 9/2014 | Rodriguez | ....... | G06K 19/07743 |
| | | | | 235/441 |
| 2017/0046611 A1* | 2/2017 | Stern | ....................... | B32B 37/00 |

\* cited by examiner

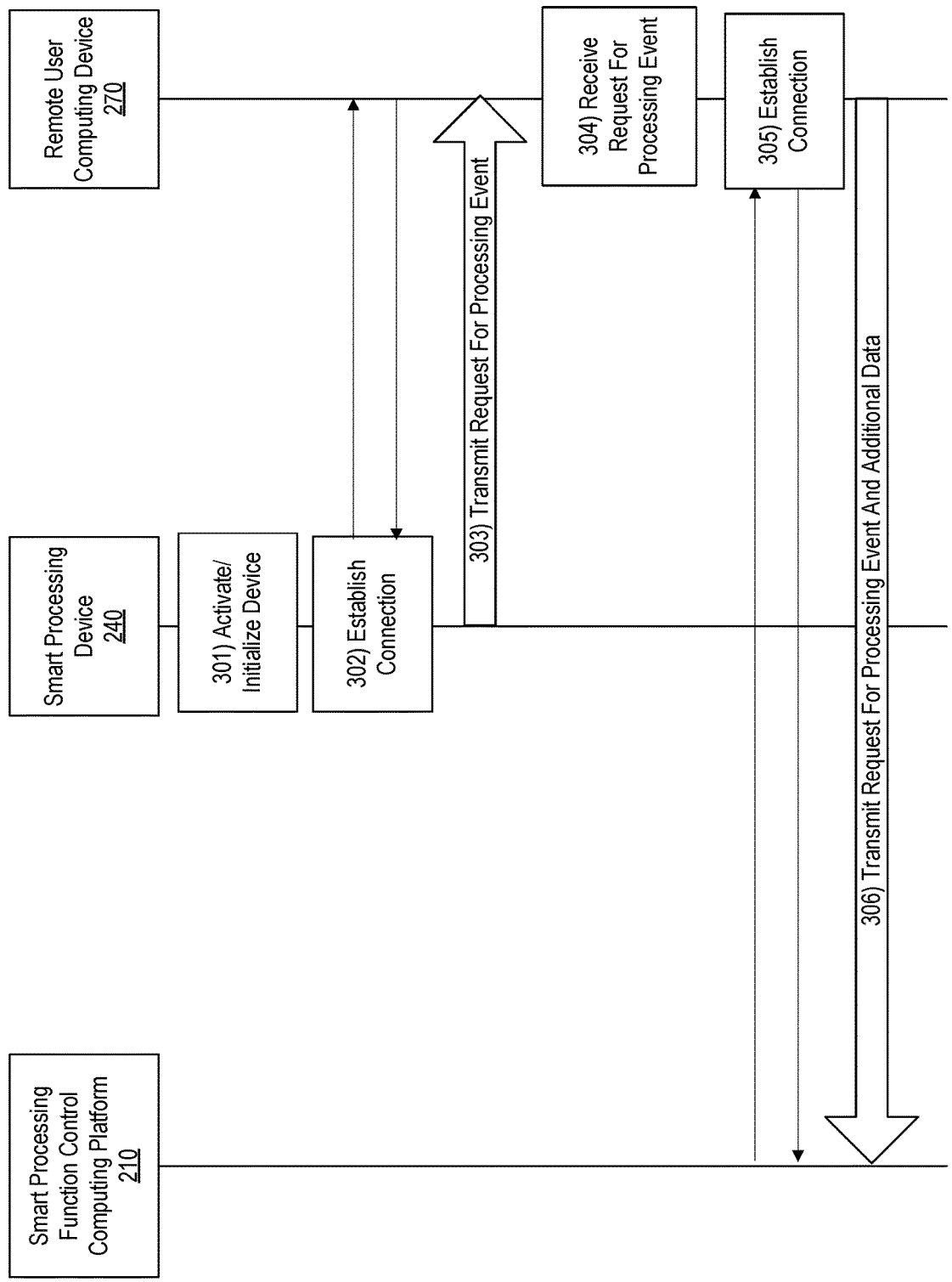

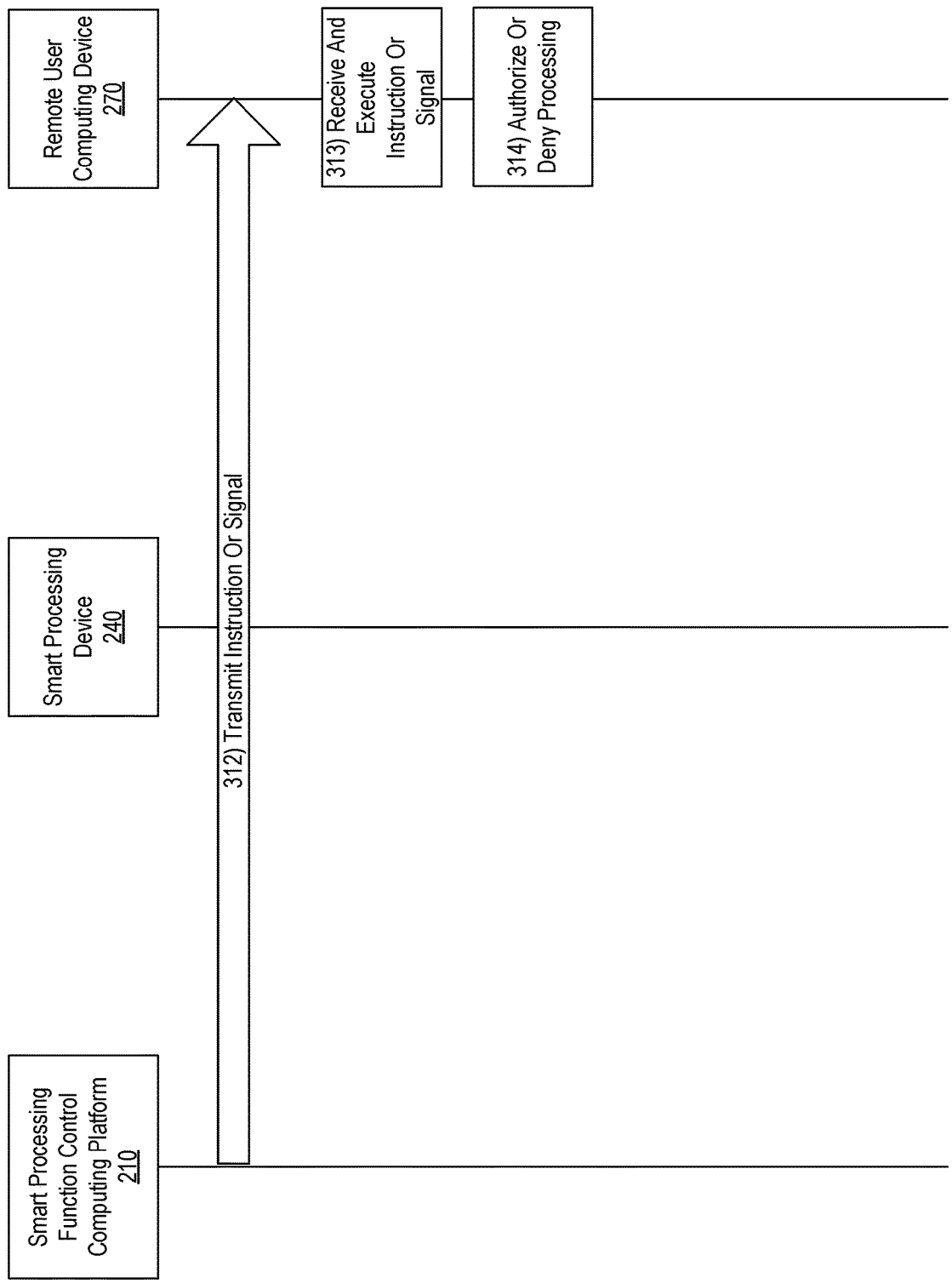

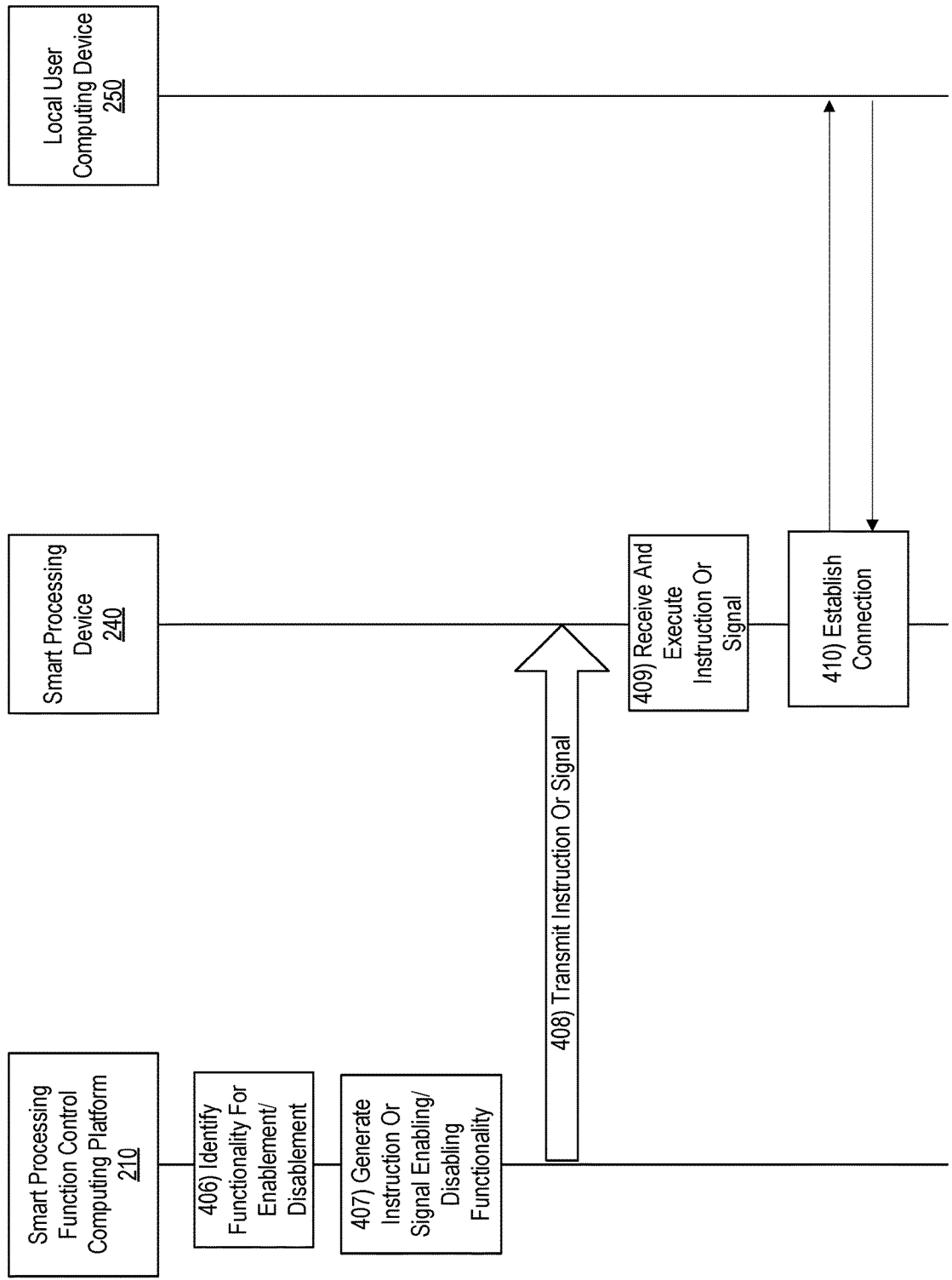

US 10,828,926 B2

SMART PROCESSING DEVICE WITH SELECTIVE CONFIGURATION FUNCTION CONTROL

BACKGROUND

Aspects of the disclosure relate to electrical computers, systems, and device configuration control. In particular, one or more aspects of the disclosure relate to providing smart processing devices with selective configuration function control.

Protecting user data, personal finances, and thwarting unauthorized activity are priorities for users today. As user devices are used for processing various events, the risks of unauthorized access to information and devices increases. In addition, controlling functionality of user devices is an important concern for users looking to maintain a tighter hold on data, finances, and the like, while also avoiding unauthorized activity associated with a device. Accordingly, it would be advantageous to provide a smart processing device having a plurality of different physical configurations that enable and/or disable functionality associated with the smart processing device.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with controlling access to user devices and functionality provided by user devices.

In some examples, a smart processing device may be provided. The smart processing device may include a central segment and a plurality of removable segments. The removable segments may be connected to the central segment (e.g., via a plurality of receiving areas) in a plurality of different configurations. In some examples, each configuration may enable or disable functionality associated with the smart processing device.

Accordingly, a system, computing platform, or the like, may receive data associated with a current physical configuration of a smart processing device. The current physical configuration data may be compared to pre-stored configuration data in order to identify one or more functions to be enabled or disabled for the smart processing device. The system, computing platform, or the like, may generate an instruction, command or signal enabling or disabling functionality and may transmit the signal to the smart processing device for execution and control of functions provided by the smart processing device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 3A-3C depict an illustrative event sequence for implementing a smart processing device with selective configuration function control in accordance with one or more aspects described herein;

FIGS. 4A-4C depicts another illustrative event sequence for implementing a smart processing device with selective configuration function control in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to smart processing devices and selective configuration function control.

As mentioned above, protecting user data, user payment devices, and the like, is a top priority for many people. As the number of ways transactions are processed increases, the likelihood of an unauthorized user obtaining payment information increases. Accordingly, it is advantageous to provide innovative ways of protecting user devices, data, payment information, and the like.

Accordingly, aspects described herein are directed to smart processing devices having a plurality of different physical configurations providing a plurality of different functionality. For instance, a smart processing device may include a central segment and a plurality of removable segments connected to the central segment. The removable segments may be removed and reconnected to the central segment in a plurality of different arrangements or configurations. In some examples, each configuration may provide different functionality. In some examples, modifying a physical configuration of the smart processing device may cause enablement or disablement of one or more functions of the smart processing device.

In some examples, a system, computing platform, or the like, may receive current physical configuration data associated with a smart processing device. Based on the current physical configuration data, one or more functions may be identified to be enabled or disabled. The system, computing platform, or the like, may generate an instruction, command or signal enabling and/or disabling functions and may transmit the instruction, command or signal to the smart processing device for execution by the smart processing device.

These and various other arrangements will be discussed more fully below.

Figure 1A:
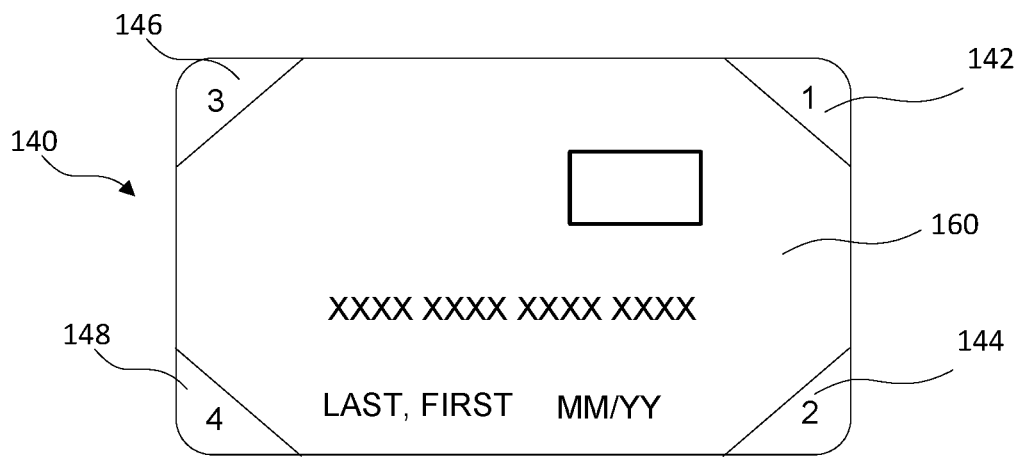
FIGS. 1A-1C illustrate an example smart processing device in different physical configurations in accordance with one or more aspects described herein.
Figure 1B:
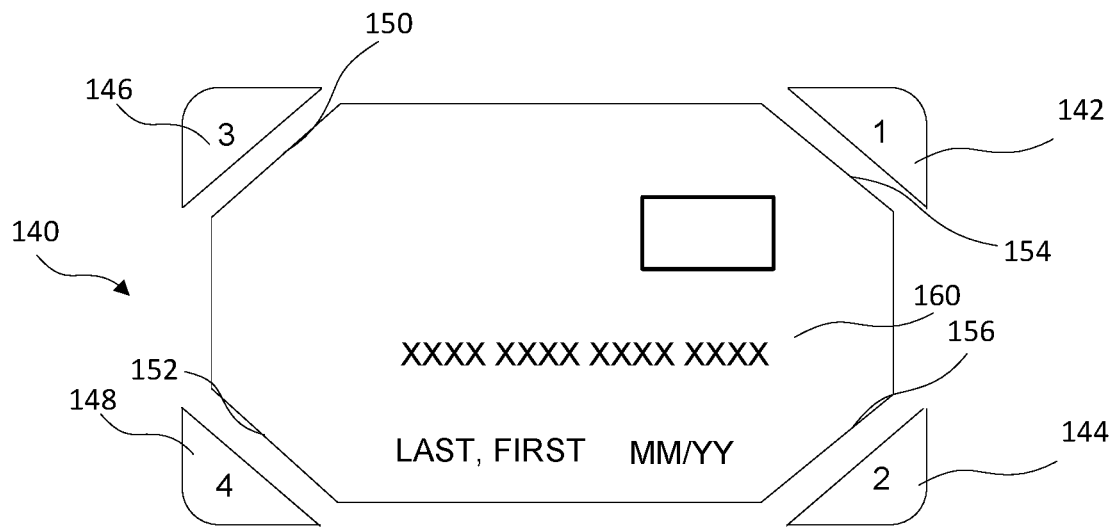
Figure 1C:
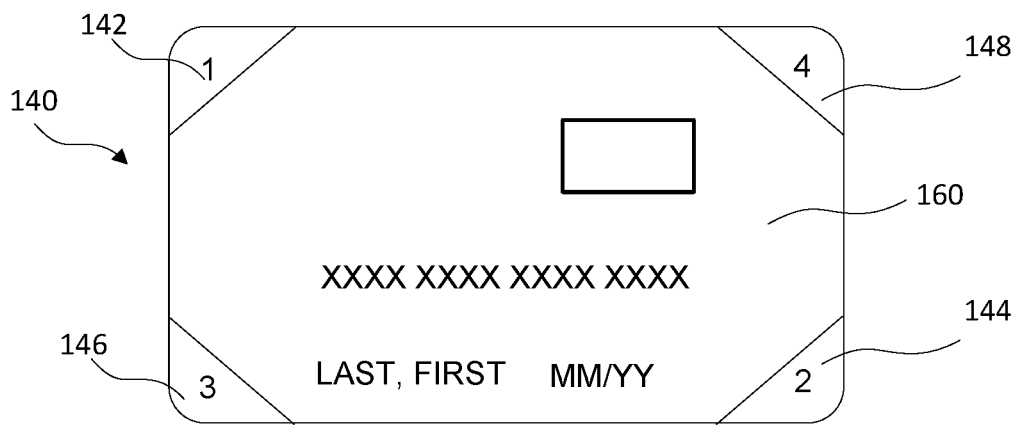

FIGS. 1A, 1B and 1C illustrate example arrangements of a smart processing device 140 in accordance with one or more aspects described herein. As shown in FIGS. 1A-1C, the smart processing device 140 may include a plurality of removable segments that, when connected to a central segment in different configurations provides different functionality for the smart processing device 140.

For instance, FIG. 1A illustrates the smart processing device 140 in a first configuration. As shown, the smart processing device 140 includes a central segment 160 that may have one or more generally planar surfaces. The central segment 160 may include an embedded chip that may be used for processing events, data associated with a user of the smart processing device, data associated with an account of the smart processing device 140, an expiration data, and the like.

Smart processing device 140 may also include a plurality of removable segments 142, 144, 146, and 148. For instance, in some examples, smart processing device 140 may include four (4) removable segments: removable segment 1 142, removable segment 2 144, removable segment 4 146 and removable segment 4 148. As shown, the removable segments 142, 144, 146, 148 generally form corners of the smart processing device 140 such that, when all removable segments 142, 144, 146, and 148 are connected to the central segment 160, the smart processing device 140 may have a generally rectangular configuration.

The removable segments 142, 144, 146, and 148 are shown connected to the smart processing device 140 in a first configuration. For instance, removable segment 1 142 is shown in an upper right corner, removable segment 2 144 is shown in a lower right corner, removable segment 3 146 is shown in an upper left corner and removable segment 4 148 is shown in a lower left corner. As will be discussed more fully herein, connection of the removable segments 142, 144, 146, and 148 in this configuration may enable and/or disable particular functionality of the smart processing device 140.

With reference to FIG. 1B, the removable segments 142, 144, 146, and 148 may be connected to the central segment 160 via a plurality of receiving areas or regions 150, 152, 154, 156. The smart processing device 140 is shown with each removable segment 142, 144, 146, 148 removed from its respective receiving area 150, 152, 154, 156 to illustrate that each removable segment 142, 144, 146, 148 may be removed from the central segment 160 and reconnected to the central segment 160 via any of the receiving areas 150, 152, 154, 156 to modify the enabled or disabled functionality of the smart processing device 140. The removable segments 142, 144, 146, 148 may be connected to the central segment 160 via snap fits, adhesives, or the like.

Figure 6:
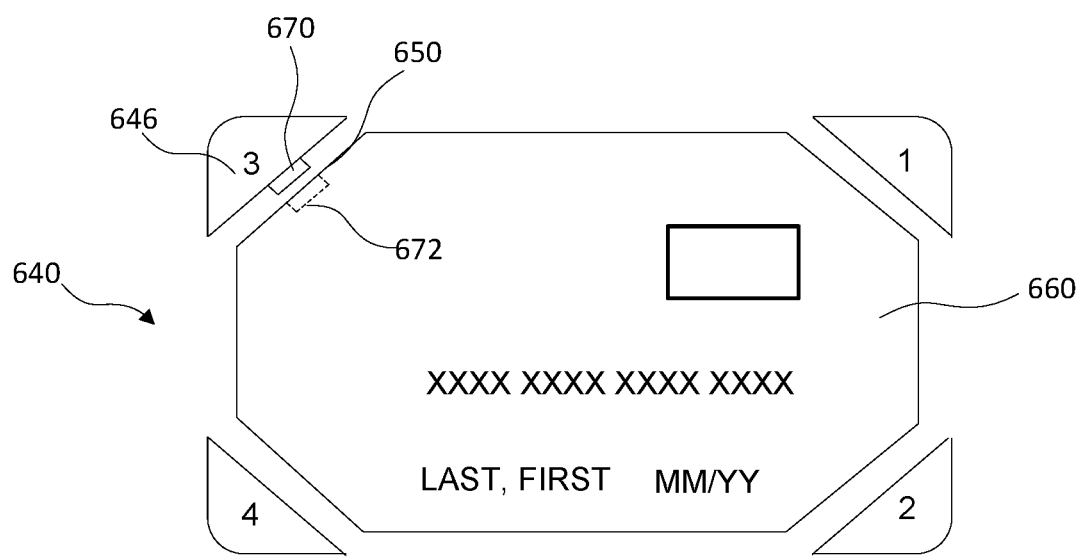
FIG. 6 illustrates another example smart processing device in accordance with one or more aspects described herein.

In some examples, the removable segments 142, 144, 146, 148 may include a protrusion configured to extend into a corresponding recess in the receiving area 150, 152, 154, 156. For instance, FIG. 6 illustrates another example smart processing device 640. As shown, removable segment 3 646 includes a protrusion 670 configured to be received by a corresponding recess 672 formed in receiving area 650 of central segment 660. Although only one removable segment 646 is shown in FIG. 6 with the protrusion arrangement, additional removable segments, or all removable segments, including segments of different shapes, may include similar protrusions.

FIG. 1C illustrates smart processing device 140 in an alternate configuration after removable segments 142, 144, 146, and 148 have been removed from central segment 160 and reconnected to different receiving areas 150, 152, 154, and 156 of central segment. As shown in FIG. 1C, removable segment 1 142 is shown in an upper left corner, removable segment 2 144 is shown in a lower right corner, removable segment 3 146 is shown in a lower left corner and removable segment 4 148 is shown in an upper right corner. This second configuration of removable segments 142, 144, 146, 148 with respect to the central segment 160 is different from the first configuration shown in FIG. 1A and, accordingly, as will be discussed more fully herein, may cause enablement and/or disablement of one or more functions of the smart processing device 140 (e.g., the functionality provided by the smart processing device 140 in the first configuration of FIG. 1A may be different from the functionality provided by the smart processing device 140 in the second configuration shown in FIG. 1C).

Figure 2A:
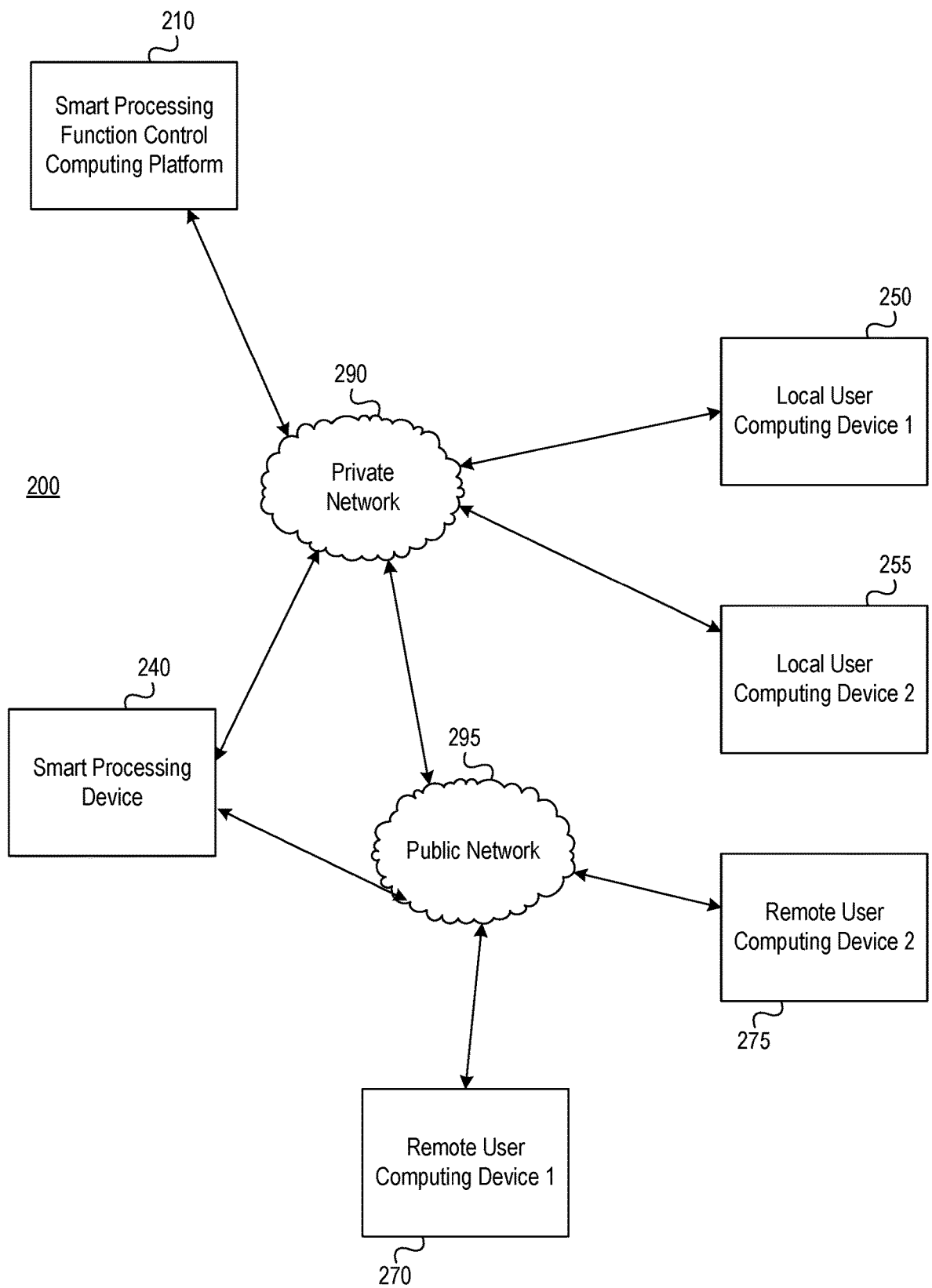
FIGS. 2A and 2B depict an illustrative computing environment for implementing a smart processing device with selective configuration function control in accordance with one or more aspects described herein.
Figure 2B:
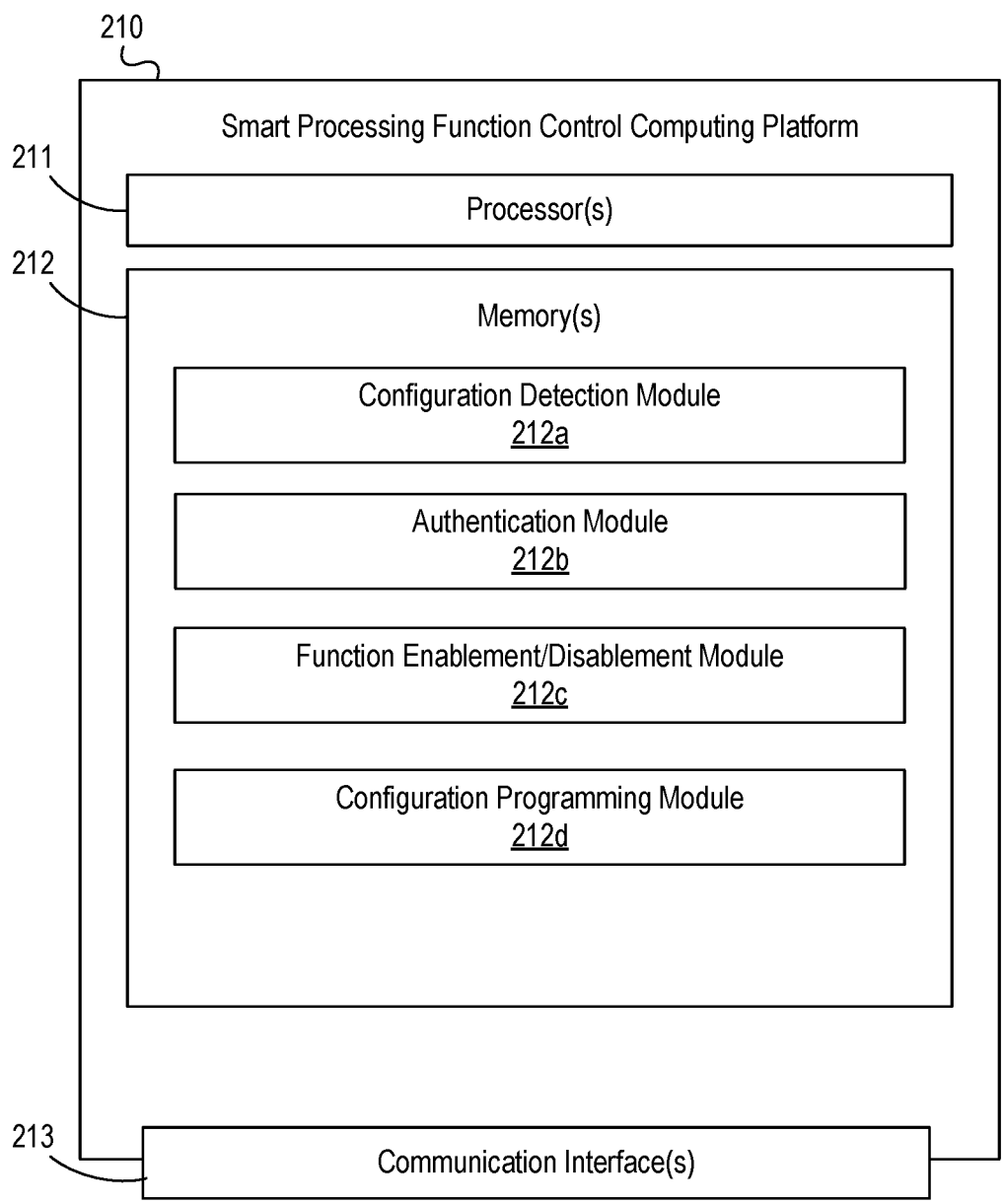

FIGS. 2A and 2B depict an illustrative computing environment for implementing and using a system for smart processing device function controls in accordance with one or more aspects described herein. Referring to FIG. 2A, computing environment 200 may include one or more computing devices and/or other computing systems. For example, computing environment 200 may include smart processing function control computing platform 210, smart processing device 240, a first local user computing device 250, a second local user computing device 255, a first remote user computing device 270, and a second remote user computing device 275.

Smart processing function control computing platform 210 may be configured to provide intelligent, dynamic control of smart processing device functionality based, for example, on a physical configuration of a smart processing device. For instance, smart processing function control computing platform 210 may receive one or more requests to process an event. For instance, a request may be received from a smart processing device 240 (e.g., upon activation or initializing of the smart processing device 240, upon requesting processing via the device 240, or the like), a local user computing device 250, 255 (e.g., an automated teller machine, self-service kiosk, or the like, at which the smart processing device 240 is being used), and/or a remote user computing device 270, 275 (e.g., a point of sale system at which the smart processing device 240 is being used, or the like).

In some examples, the request may include data associated with a physical configuration of the smart processing device 240. For instance, the smart processing device 240 may include a central, planar segment and a plurality of removable segments. In some examples, the segments may be configured to be removably connected to the central, planar segment (e.g., at corners of the central region, at different sides of the central region, and the like). In some examples, the plurality of removable segments may include a protrusion configured to be received in a corresponding recess on the central segment. Additionally or alternatively, the removable segments may connect to the central segment via adhesives, snap fits, or the like.

As mentioned above, the plurality of removable segments may be configured to be removed from or connected to the central segment. As discussed more fully herein, the removable segments may be configured to be received in any of a plurality of receiving areas of the central segment. Accordingly, different physical configurations of the smart processing device 240 may be created by removing segments and replacing them with other segments.

The smart processing function control computing platform 210 may receive physical configuration data and may evaluate the data to identify functionality to enable or disable, process or deny an event processing request, or the like, based on the physical configuration of the smart processing device 240 (e.g., which removable segments are received in which receiving areas of the central segment). Based on the evaluation, an instruction or signal may be generated and transmitted to the smart processing device 240 enabling or disabling functionality, denying or processing an event, or the like. In some examples, an instruction or signal may be transmitted to another computing device, such as local user computing device 250, 255 or remote user computing device 270, 275, processing or denying an event processing request, or the like.

Smart processing device 240 may be any type of device used to process events, such as a payment device (e.g., credit or debit card) used to conduct transactions, a radio frequency identification (RFID) card used to enter a restricted area or building, or the like. In some examples, smart processing device 240 may include a microprocessor, memory, and the like.

Smart processing device 240 may include a central, planar segment having a plurality of receiving areas configured to receive a plurality of removable segments. As discussed herein, the configuration of the removable segments in the receiving areas of the central segment may determine what, if any, functionality is enabled for the smart processing device 240.

Local user computing device 250, 255 and remote user computing device 270, 275 may be configured to communicate with and/or connect to one or more computing devices or systems shown in FIG. 2A. For instance, local user computing device 250, 255 may communicate with one or more computing systems or devices via network 290, while remote user computing device 270, 275 may communicate with one or more computing systems or devices via network 295. In some examples, local user computing device 250, 255 may be used to access one or more entity systems, functions or processes. In some examples, local user computing device 250, 255 may be used to access the smart processing function control computing platform 210 to control parameters of the system, update or execute rules, modify settings, display notifications, and the like. Additionally or alternatively, local user computing device 250, 255 may be an ATM or other self-service kiosk at which a user is attempting to process a transaction.

The remote user computing devices 270, 275 may be used to communicate with, for example, smart processing function control computing platform 210. For instance, remote user computing devices 270, 275 may include user computing devices, such as mobile devices including smartphones, tablets, laptop computers, wearable devices, point-of-sale systems, and the like, that may be used to communicate with smart processing function control computing platform 210, receive instructions or signals related to a requested event, process or deny processing of an event, and the like. In some examples, remote user computing device 270, 275 may be a device at a building or other secure site to which a user is attempting to gain access that may detect a signal from smart processing device 240 in order to initiate authentication, provide access, and the like.

In one or more arrangements, smart processing device 240, local user computing device 250, local user computing device 255, remote user computing device 270, and/or remote user computing device 275 may be any type of computing device or combination of devices configured to perform the particular functions described herein. For example, smart processing device 240, local user computing device 250, local user computing device 255, remote user computing device 270, and/or remote user computing device 275 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of smart processing device 240, local user computing device 250, local user computing device 255, remote user computing device 270, and/or remote user computing device 275 may, in some instances, be special-purpose computing devices configured to perform specific functions.

Computing environment 200 also may include one or more computing platforms. For example, and as noted above, computing environment 200 may include smart processing function control computing platform 210. As illustrated in greater detail below, smart processing function control computing platform 210 may include one or more computing devices configured to perform one or more of the functions described herein. For example, smart processing function control computing platform 210 may include one or more computers (e.g., laptop computers, desktop computers, servers, server blades, or the like).

As mentioned above, computing environment 200 also may include one or more networks, which may interconnect one or more of smart processing function control computing platform 210, smart processing device 240, local user computing device 250, local user computing device 255, remote user computing device 270, and/or remote user computing device 275. For example, computing environment 200 may include private network 290 and public network 295. Private network 290 and/or public network 295 may include one or more sub-networks (e.g., Local Area Networks (LANs), Wide Area Networks (WANs), or the like). Private network 290 may be associated with a particular organization (e.g., a corporation, financial institution, educational institution, governmental institution, or the like) and may interconnect one or more computing devices associated with the organization. For example, smart processing function control computing platform 210, local user computing device 250, local user computing device 255, and, in some examples, smart processing device 240, may be associated with an organization (e.g., a financial institution), and private network 290 may be associated with and/or operated by the organization, and may include one or more networks (e.g., LANs, WANs, virtual private networks (VPNs), or the like) that interconnect smart processing function control computing platform 210, local user computing device 250, local user computing device 255, and, in some examples, smart processing device 240, and one or more other computing devices and/or computer systems that are used by, operated by, and/or otherwise associated with the organization. Public network 295 may connect private network 290 and/or one or more computing devices connected thereto (e.g., smart processing function control computing platform 210, local user computing device 250, local user computing device 255, and, in some examples, smart processing device 240) with one or more networks and/or computing devices that are not associated with the organization. For example, remote user computing device 270, remote user computing device 275, and, in some examples, smart processing device 240, might not be associated with an organization that operates private network 290 (e.g., because remote user computing device 270, remote user computing device 275, and, in some examples, smart processing device 240, may be owned, operated, and/or serviced by one or more entities different from the organization that operates private network 290, such as a second entity different from the entity, one or more customers of the organization, public or government entities, and/or vendors of the organization, rather than being owned and/or operated by the organization itself or an employee or affiliate of the organization), and public network 295 may include one or more networks (e.g., the internet) that connect remote user computing device 270, remote user computing device 275, and, in some examples, smart processing device 240, to private network 290 and/or one or more computing devices connected thereto (e.g., smart processing function control computing platform 210, local user computing device 250, local user computing device 255, and, in some examples, smart processing device 240).

Referring to FIG. 2B, smart processing function control computing platform 210 may include one or more processors 211, memory 212, and communication interface 213. A data bus may interconnect processor(s) 211, memory 212, and communication interface 213.

Communication interface 213 may be a network interface configured to support communication between smart processing function control computing platform 210 and one or more networks (e.g., private network 290, public network 295, or the like). Memory 212 may include one or more program modules having instructions that when executed by processor(s) 211 cause smart processing function control computing platform 210 to perform one or more functions described herein and/or one or more databases that may store and/or otherwise maintain information which may be used by such program modules and/or processor(s) 211. In some instances, the one or more program modules and/or databases may be stored by and/or maintained in different memory units of smart processing function control computing platform 210 and/or by different computing devices that may form and/or otherwise make up smart processing function control computing platform 210.

For example, memory 212 may have, store and/or include a configuration detection module 212a. Configuration detection module 212a may store instructions and/or data that may cause or enable the smart processing function control computing platform 210 to receive data from a smart processing device 240, or other computing device, such as local user computing device 250, 255, remote user computing device 270, 275, or the like, indicating a physical configuration of the smart processing device 240. For instance, the data may include signals or other data indicating which removable segments is connected to which receiving region of the central segment. This data may then be analyzed to determine what, if any, functions of the smart processing device 240 should be enabled or disabled.

Smart processing function control computing platform 210 may further have, store and/or include an authentication module 212b. Authentication module 212b may include instructions and/or data that may cause or enable the smart processing function control computing platform 210 to receive data from or associated with a smart processing device 240 and authenticate the device 240, user associated therewith, or the like. For instance, data associated with a smart processing device 240, a physical configuration of the device, or the like, may be compared to pre-stored or expected data to determine whether the smart processing device 240, or user attempting to process an event via the smart processing device, is authenticated.

Smart processing function control computing platform 210 may further have, store and/or include a function enablement/disablement module 212c. Function enablement/disablement module 212c may store instructions and/or data that may cause or enable the smart processing function control computing platform 210 to evaluate a detected configuration of a smart processing device (e.g., based on a configuration detected via the configuration detection module 212a) and identify one or more functions, if any, of the smart processing device 240 that should be enabled or disabled based on the configuration. For instance, if the removable segments are detected in a first configuration, a first set of functions may be enabled (e.g., transaction processing up to $X, or the like). If the removable segments are detected in a second, different configuration, a second set of functions may be enabled (e.g., transaction processing up to $Y, or the like). In some examples, some configurations may include overlapping functions (e.g., both the first and second configurations may permit withdrawals of funds up to $Z, or the like). In other examples, each configuration may include functions not found in another configuration.

Further, the detected configuration may cause one or more functions to be disabled. For instance, detection of the removable segments in a third configuration different from the first configuration and the second configuration may disable the smart processing device 240 and prevent the device from being used in any way until additional information is provided by a user to unlock the device 240. In another example, detection of the removable segments in a fourth configuration different from the first configuration, second configuration and third configuration, may trigger disablement of functions associated with withdrawing funds from an account associated with the smart processing device 240. Various other types of functions may be enabled or disabled without departing from the invention.

Smart processing function control computing platform 210 may further have, store and/or include configuration programming module 212d. Configuration programming module 212d may store instructions and/or data that may cause or enable the smart processing function control computing platform 210 to receive user input or selections identifying particular functions to be enabled or disabled with particular physical configurations of the smart processing device 240. For instance, a user may select or program the smart processing device 240 perform different functions in different configurations. Accordingly, the physical configurations and associated functions may be customizable by a user, further improving security associated with the device.

Figure 3B:
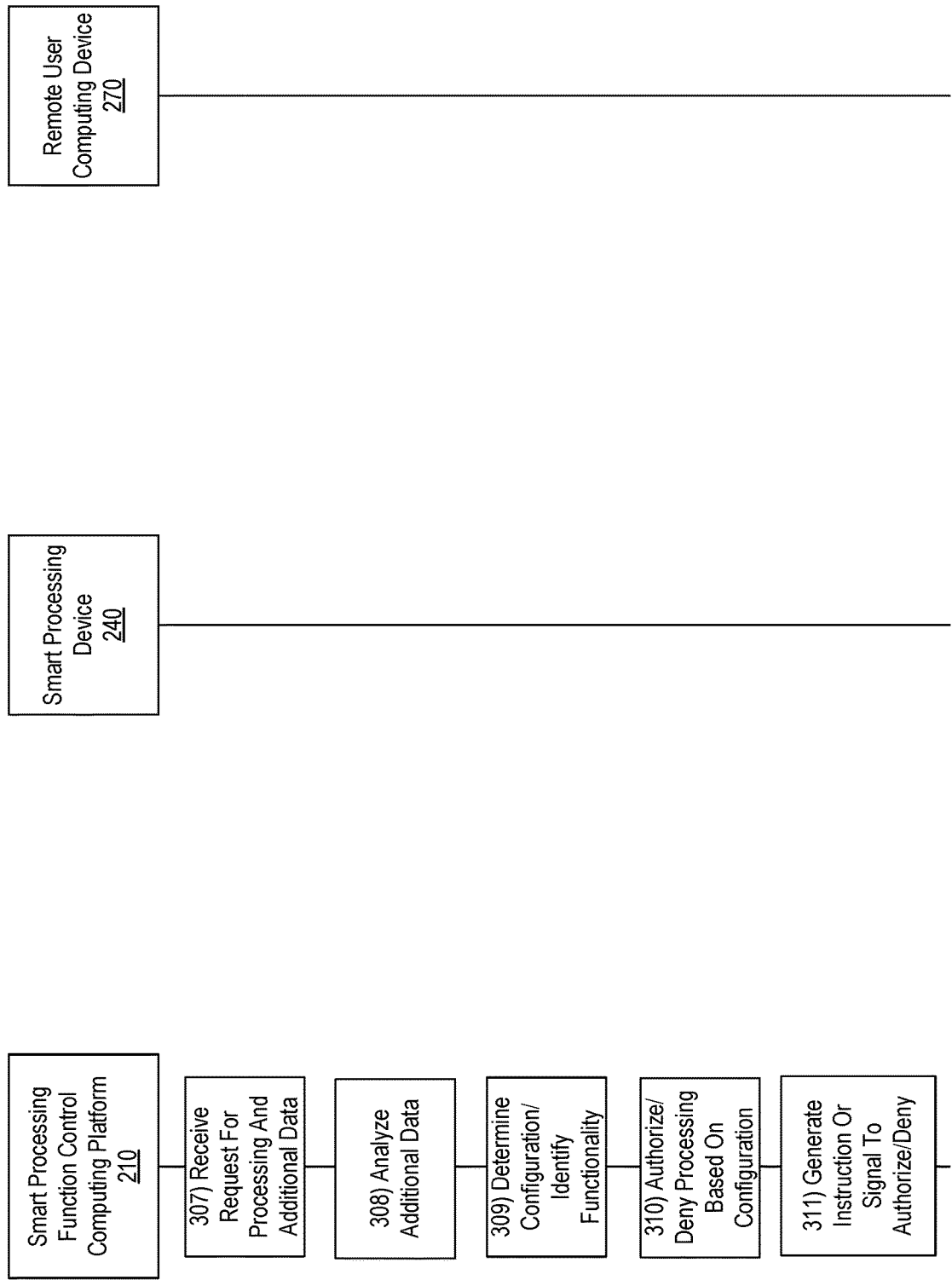

FIGS. 3A-3C depict one example illustrative event sequence for implementing and using smart processing function controls in accordance with one or more aspects described herein. The events shown in the illustrative event sequence are merely one example sequence and additional events may be added, or events may be omitted, without departing from the invention.

Referring to FIG. 3A, at step 301, a smart processing device 240 may be activated or initialized. In some examples, activating or initializing the smart processing device 240 may include connecting one or more removable segments to the central segment. For example, as an added measure of security, one or more removable segments may be removed from the smart processing device 240 for storage (e.g., when the device 240 is not being used). Removal of one or more removable segments may render the device 240 virtually useless as, in at least some examples, the smart processing device 240 may require removable segments to be received in each receiving region in order to be activated. Accordingly, by connecting one or more removable segments to the receiving regions of the smart processing device 240, the smart processing device 240 may be activated or initialized.

At step 302, a connection may be established between the smart processing device 240 and remote user computing device 270. In some examples, the remote user computing device 270 may be a point-of-sale system at which the smart processing device 240 is being used to conduct a transaction or process an event. Although in the example of FIGS. 3A-3C, the communication is performed between the smart processing device 240 and a remote user computing device, in some examples, a local user computing device 250, 255 (e.g., an ATM, self-service kiosk, or the like) may be used instead of the remote user computing device.

The connection established between the smart processing device 240 and the remote user computing device 270 may be a first wireless connection. Upon establishing the first wireless connection, a communication session may be initiated between the smart processing device 240 and the remote user computing device 270.

At step 303, a request for processing an event may be transmitted from the smart processing device 240 to the remote user computing device 270. For instance, the request for processing may be transmitted during the communication session established upon initiating the first wireless connection. The request for processing an event may include a request for processing a transaction, such as a purchase or payment, a withdrawal of funds, a transfer of funds, or the like.

At step 304, the request for processing the event may be received from the smart processing device. In some examples, the request may include additional data associated with the smart processing device 240. In some examples, the additional data may include data associated with a physical configuration of the smart processing device 240 (e.g., which removable segments are connected to which receiving regions of the central segment), as well as data associated with the event, such as amount, type, and other event features.

At step 305, a connection may be established between the remote user computing device 270 and the smart processing function control computing platform 210. For instance, a second wireless connection may be established between the remote user computing device 270 and the smart processing function control computing platform 210. Upon establishing the second wireless connection, a communication session may be initiated between the remote user computing device 270 and the smart processing function control computing platform 210.

At step 306, the request for processing the event may be transmitted from the remote user computing device 270 to the smart processing function control computing platform 210. In some examples, the request for processing the event may include the additional data, such as physical configuration data of the smart processing device 240 transmitted from the smart processing device 240 to the remote user computing device 270, the features of the event, and the like.

With reference to FIG. 3B, at step 307, the request for processing the event and additional data may be received by the smart processing function control computing platform 210. At step 308, the received request and additional data may be analyzed.

At step 309, based on the analyzed additional data, a physical configuration of the smart processing device may be determined. For instance, configuration data of the smart processing device 240 may be extracted and compared to pre-stored configurations and associated functionality. In some examples, the configurations may be stored in a look up table such that, when current configuration data is received, it can be used to look up the associated functionality. The associated functionality may be compared to features of the event to determine whether the event should be approved for processing or denied based on activated functionality of the device in the particular configuration.

Based on the determined configuration and identified functionality, at step 310, the requested event may be authorized or denied. At step 311, an instruction, command or signal to authorize or deny the requested event may be generated by the smart processing function control computing platform 210.

With reference to FIG. 3C, at step 312, the generated instruction, command or signal may be transmitted from the smart processing function control computing platform 210 to the remote user computing device 270.

At step 313, the instruction, command or signal may be received by the remote user computing device 270 and may be executed. At step 314, the event processing request may be approved or denied based on the executed signal.

Figure 4A:
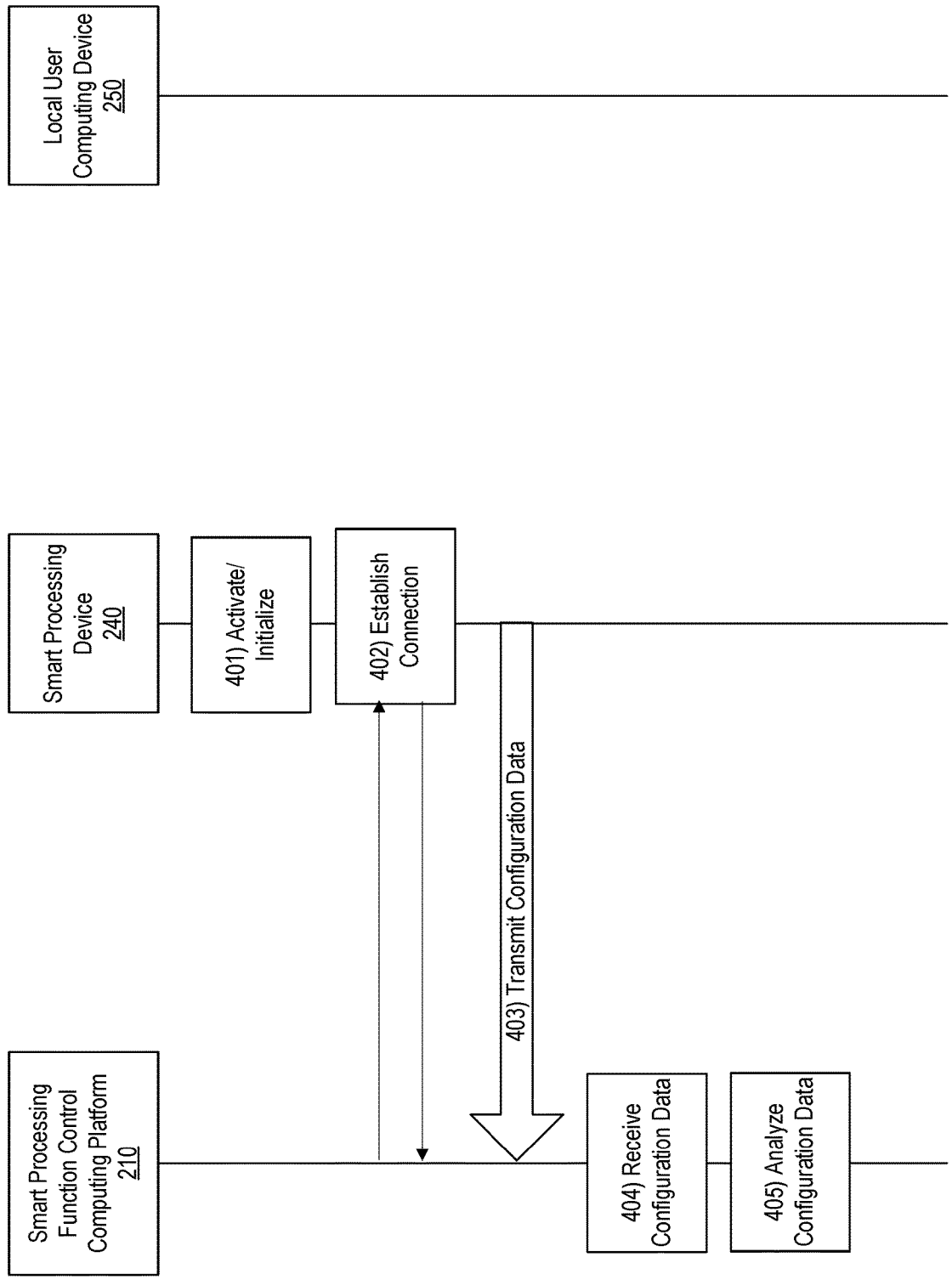
Figure 4C:
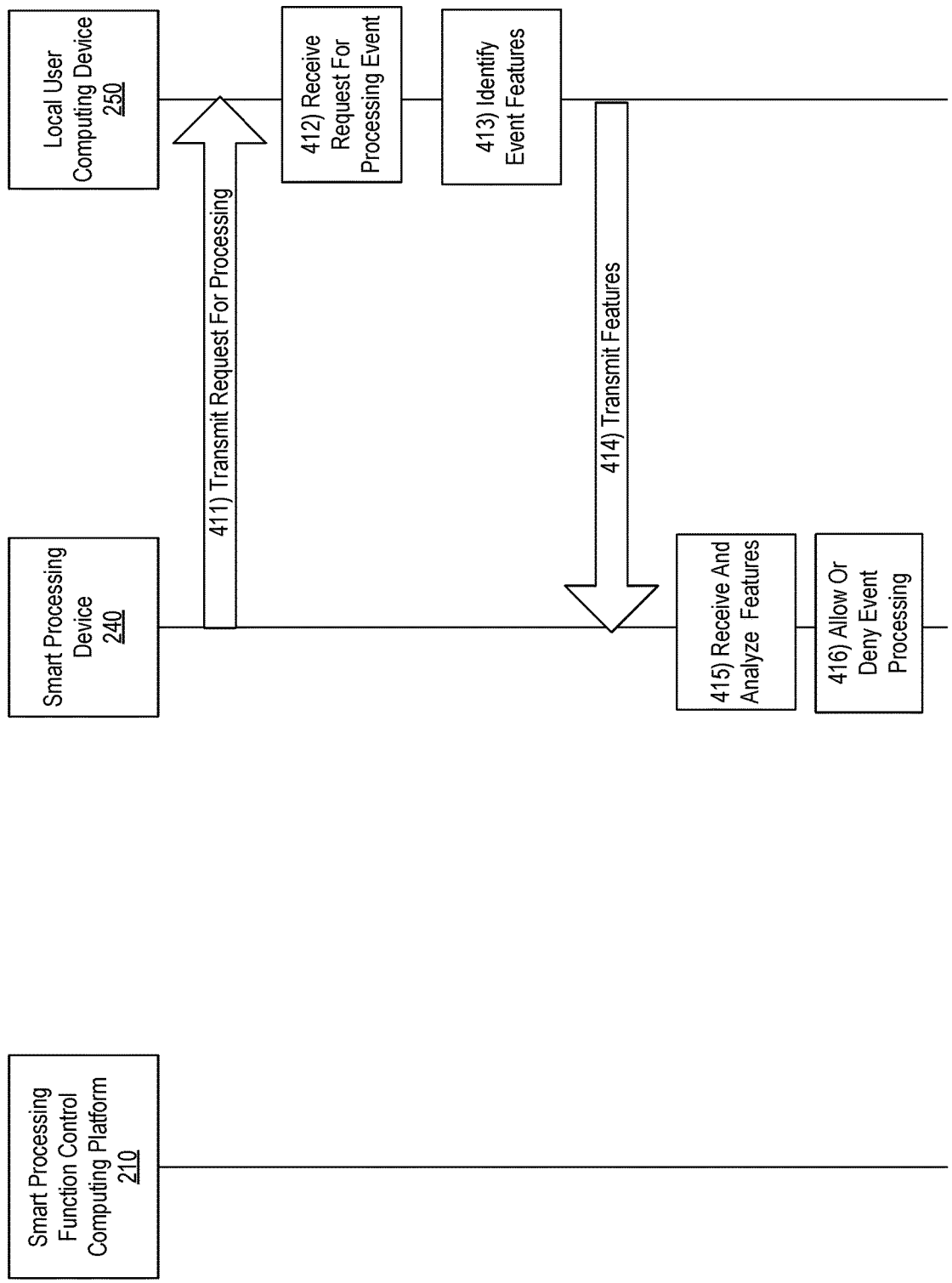

FIGS. 4A-4C depict another example illustrative event sequence for implementing and using smart processing function controls in accordance with one or more aspects described herein. The events shown in the illustrative event sequence are merely one example sequence and additional events may be added, or events may be omitted, without departing from the invention.

Referring to FIG. 4A, at step 401, a smart processing device 240 may be activated or initialized. As discussed above, in some examples, activating or initializing the smart processing device 240 may include connecting one or more removable segments to the central segment. For example, as an added measure of security, one or more removable segments may be removed from the smart processing device 240 for storage (e.g., when the device 240 is not being used). Removal of one or more removable segments may render the device 240 virtually useless as, in at least some examples, the smart processing device 240 may require removable segments to be received in each receiving region in order to be activated. Accordingly, by connecting one or more removable segments to the receiving regions of the smart processing device 240, the smart processing device 240 may be activated or initialized.

At step 402, a connection may be established between the smart processing device 240 and smart processing function control computing platform 210. For instance, a first wireless connection may be established between the smart processing device 240 and the smart processing function control computing platform 210. Upon establishing the first wireless connection, a communication session may be initiated between the smart processing device 240 and the smart processing function control computing platform 210.

At step 403, configuration data may be transmitted from the smart processing device 240 to the smart processing function control computing platform 210. For instance, a physical position or arrangement of removable segments with respect to a central segment of the smart processing device 240 may be transmitted to the smart processing function control computing platform 210.

At step 404, the configuration data may be received by the smart processing function control computing platform 210. At step 405, the received configuration data may be analyzed to determine one or more functions of the smart processing device to be enabled or disabled based on the current configuration of the smart processing device 240 and the analyzed configuration data.

With reference to FIG. 4B, at step 406, functionality to be enabled and/or disabled may be identified. For instance, based on the analysis of the configuration data, one or more functions of the smart processing device 240 to be enabled or disabled may be identified.

At step 407, an instruction, command or signal may be generated. The generated instruction, command or signal may enable and/or disable the identified functions. At step 408, the generated instruction, command or signal may be transmitted from the smart processing function control computing platform 210 to the smart processing device 240.

At step 409, the generated instruction, command or signal may be executed by the smart processing device 240. Upon execution of the instruction, command or signal, the smart processing device 240 will enable or disable the identified functions and may be used to process events that encompass the enabled functions and may prevent processing events that encompass the disabled functions.

For instance, the smart processing device 240 may be used to process an event at an ATM. Accordingly, at step 410, a connection may be established between the smart processing device 240 and local user computing device 250. Although local user computing device 250 is shown, other types of events or computing devices, such as remote user computing device 270, 275, may be used without departing from the invention.

The connection established may be a second wireless connection and, upon establishing the second wireless connection, a communication session may be initiated between the smart processing device 240 and the local user computing device 250.

With reference to FIG. 4C, at step 411, a request for processing an event may be transmitted to the local user computing device 250. For instance, the smart processing device 240 may be inserted into the local user computing device 250 (e.g., ATM), detected within proximity of the device 250, or the like, to initiate processing the event. The request for processing the event may be transmitted during the communication session initiated upon establishing the second wireless connection.

At step 412, the request for processing the event may be received by the local user computing device 250. At step 413, one or more event features or parameters may be identified. For instance, an amount of a requested event, a type of event requested, and the like, may be identified.

At step 414, the event features may be transmitted to the smart processing device 240. At 415, the event features may be received and analyzed to determine whether they are associated with or include one or more functions enabled for the smart processing device 240 based on the physical configuration of the smart processing device 240. At step 416, the event may be processed or denied based on whether the event features are associated with a function enabled based on the physical configuration of the smart processing device 240.

Figure 5:
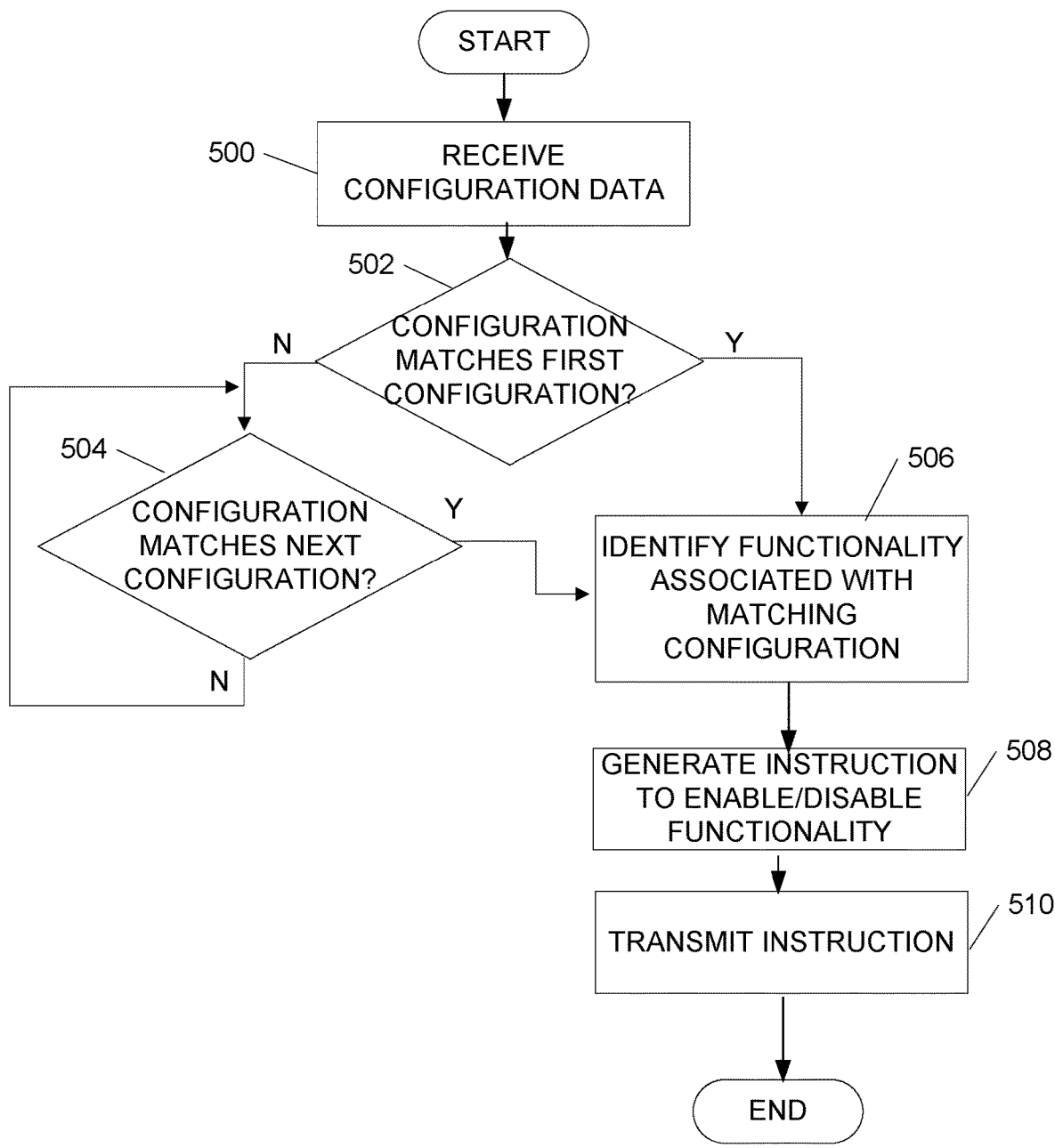
FIG. 5 depicts an illustrative method for implementing and using a system to smart processing device selective configuration function control processes, according to one or more aspects described herein.

FIG. 5 is a flow chart illustrating one example method of providing smart processing function controls according to one or more aspects described herein. The processes illustrated in FIG. 5 are merely some example processes and functions. The steps shown may be performed in a different order, more steps may be added, or one or more steps may be omitted, without departing from the invention.

At step 500, configuration data associated with a smart processing device 240 may be received. For instance, physical configuration data associated with an arrangement of removable segments of the smart processing device relative to a central segment of the smart processing device may be received.

At step 502, the received configuration data may be analyzed to determine whether it matches a first pre-stored configuration. For instance, a plurality of pre-stored configurations may be preregistered and each pre-stored configuration may include identification of one or more functions to be enabled or disabled upon detection of the smart processing device in the configuration. If, at step 502, the received configuration data does not match a first pre-stored configuration, a determination may be made at step 504, as to whether the configuration data matches next pre-stored configuration data. If not, the process may return to step 504 to determine whether it matches a next pre-stored configuration data.

If, at step 502 or 504, the configuration data matches configuration data, functionality associated with the matching configuration may be identified at step 506. For instance, one or more functions to be enabled or disabled may be identified based on the matching pre-stored configuration.

At step 508, an instruction, command or signal to enable and/or disable the identified functionality may be generated. At step 510, the instruction, command or signal may be transmitted to the smart processing device 240.

Figure 7A:
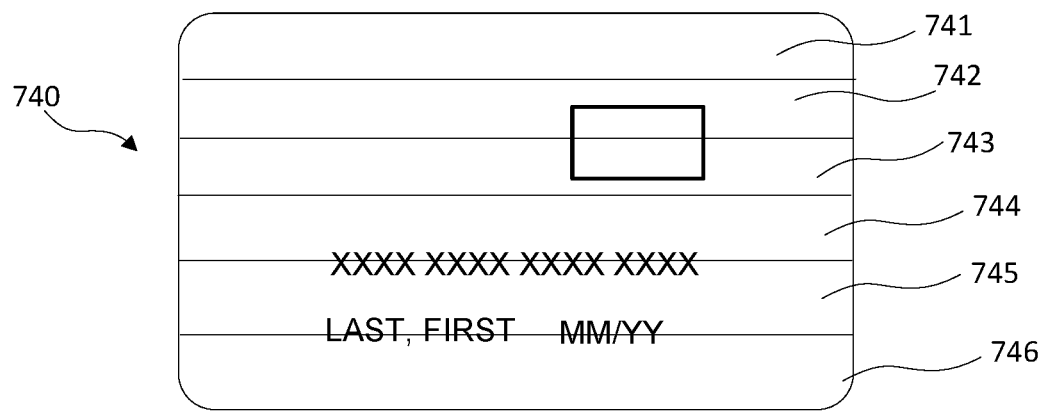
FIGS. 7A and 7B illustrate alternate example smart processing devices in accordance with one or more aspects described herein.
Figure 7B:
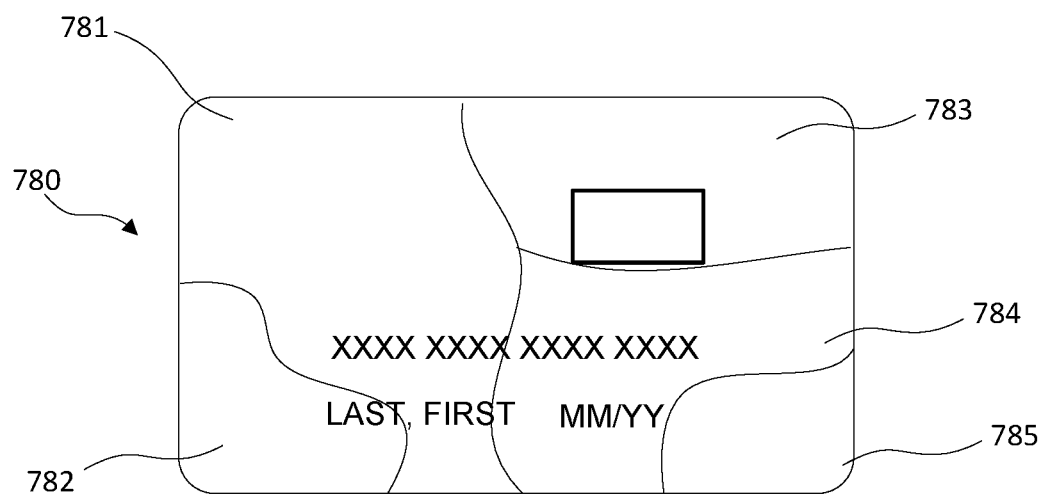

FIGS. 7A and 7B illustrate alternative example arrangements of a smart processing device in accordance with one or more aspects described herein. In some example arrangements, such as shown in FIGS. 7A and 7B, the smart processing device 740, 780 might not include a central segment and, instead, the entire smart processing device 740, 780 may be comprised of removable segments. For instance, as shown in FIG. 7A, smart processing device 740 includes removable segments 741, 742, 743, 744, 745, and 746. As shown in FIG. 7B, smart processing device 780 includes removable segments 781, 782, 783, 784, 785. More or fewer removable segments may be provided without departing from the invention.

As shown in FIG. 7A, the removable segments 741, 742, 743, 744, 745, 746 each form substantially rectangular segments. However, other segment shapes may be used without departing from the invention. For instance, the smart processing device 740 may be divided into 4 segments total having a slightly squarer shape. Various other arrangements may be used without departing from the invention. For instance, as shown in FIG. 7B, each removable segment 781, 782, 783, 784, 785 may have an irregular shape. In some examples, the irregular shapes may fit together to form the smart processing device 780.

Similar to arrangements described herein, the removable segments 741, 742, 743, 744, 745, and 746 may be removed (e.g., non-destructively disconnected from one or more other removable segments 741, 742, 743, 744, 745, 746) from smart processing device 740 and reconnected in a different order or physical configuration to modify functionality of the smart processing device 740. Accordingly, rearranging the removable segments 741, 742, 743, 744, 745, 746 of the smart processing device 740 may generate additional functionality, reduce available functionality, increase security, or the like.

Similarly, removable segments 781, 782, 783, 784, 785 may be disconnected from one or more other removable segments 781, 782, 783, 784, 785 and reconnected in a different order or physical configuration to modify functionality of the smart processing device 780. In some examples, each removable segment 781, 782, 783, 784, 785 may have an assigned function such that, adding or removing the particular removable segment may add or remove the assigned function from the functionality of the smart processing device 780. Accordingly, in these arrangements, the smart processing device 780 may provide a variety of functions and may have a variety of shapes and physical configurations based on which removable segments 781, 782, 783, 784, 785 are connected.

Aspects described herein relate to smart processing devices and controlling functionality associated with smart processing devices based on a physical configuration of the smart processing device. For instance, the smart processing device may include a plurality of removable segments configured to be received by a central segment in a plurality of different configurations. In some examples, each configuration may enable different functionality of the smart processing device. Additionally or alternatively, some configurations may build on or add additional functionality to functionality previously enabled based on a previous physical configuration of the smart processing device.

For instance, in some examples, connection of the removable segments to the central segment in a first physical configuration may enable first functionality of the smart processing device while connection of the removable segments to the central segment in a second, different physical configuration may enable second functionality different from the first functionality. In some examples, enabling the second functionality may include disabling functions associated with the first functionality and enabling functions associated with the second functionality (e.g., functions that may be different from the first functionality). In some examples, enabling the second functionality may include adding additional functionality to the functionality already enabled in the first functionality (e.g., more functions may be enabled in the second configuration than the first configuration). In some examples, the plurality of different configurations may include at least one configuration that causes disablement of all functions of the smart processing device and at least two different configurations enabling two different functions or sets of functions for which the smart processing device may be used. In some arrangements, all configurations of the smart processing device may enable at least one positive function of the smart processing device. Stated differently, each configuration may include enabling at least one function for which the smart processing device may be used such that none of the configuration, in these examples, may completely disable the functionality of the smart processing device.

Further, the arrangements discussed herein may be performed in real-time or near real-time. For instance, current physical configuration data of a smart processing device may be transmitted to a computing platform for analysis in real-time or near real-time. The computing platform may then identify functionality to be enabled or disabled, generate an instruction and/or transmit the instruction for execution in real-time or near real-time.

In some examples, a smart processing device may initialize or be activated upon receiving one or more removable segments in the corresponding central segment. In some arrangements, the smart processing device may initialize or be activated upon receiving removable segments in all receiving areas of the central segment. Accordingly, if a central segment has four receiving areas, the smart processing device may be initialized or activated upon receiving a removable segment in each of the four receiving areas. In some arrangements, a user may store at least one removable segment removed from the central segment (and, in some examples, other removable segments) such that if the central segment is lost or misplaced, an unauthorized user would be unable to use the smart processing device without also obtaining the removable segment stored separately.

Additionally or alternatively, a user may store the smart processing device with removable segments connected in a configuration that may disable the smart processing device. Accordingly, if the device is obtained by an unauthorized user, it would not be functionality unless the user was able to reconfigure the removable segments to a configuration enabling functionality.

Although various arrangements described herein include a description of a smart processing device having a number of removable segments corresponding to a number of receiving areas on a central segment of the smart processing device, in some examples, a smart processing device may include more removable segments than receiving areas, to provide to provide even more potential physical configurations of the smart processing device and even more options for enabling/disabling functionality.

Further, although various arrangements described herein provide portions (e.g., subsets) of a rectangular smart processing device as removable segments, in some arrangements, the smart processing device may be formed using different layers. For instance, if a smart processing device is, for example, 3 mm thick, each 1 mm may be formed by a different layer. Accordingly, functionality may be modified by removing layers, adding layers, rearranging layers, and the like.

In some examples, each removable segment may provide a different type of functionality. For instance, a first removable segment may control types of events that may be processed, a second removable segment may control an amount that may be withdrawn from an account, a third removable segment may control an amount of transaction to be processed, a fourth removable segment may control initializing or activating a smart processing device, and the like. Accordingly, in some examples, the functionality enabled may be determined based on which, if any, removable segments are connected to the central segment. In some examples, the smart processing device may provide functionality without all removable segments being connected (e.g., if only some types of functionality are desired, only those removable segments may be connected). Further, in some arrangements, each removable segment may control a type of functionality while the receiving area to which the removable segment is connected may control further limits on the type of functionality (e.g., accounts that may be used, types of purchases that may be made, or the like).

In some examples, one or more configurations may be used to provide additional security to a user. For instance, one physical configuration (e.g., of removable segments relative to the central segment) may be provided that, when detected, may sound an alarm. In another example, a physical configuration (e.g., of removable segments relative to the central segment) may cause the smart processing device to emit a signal that may be detected by law enforcement to aid in tracking a device, unauthorized users of the device, or the like.

In some examples, the configurations may provide broad changes in functionality. For instance, a first physical configuration may render the smart processing device useless, while a second configuration may enable full functionality, while a third configuration may cause an alarm to sound. Additionally or alternatively, the different configurations may provide more granular modification of functionality. For instance, particular types of functionality may be abled or disabled, such as types of events to the processed, amount limits on events, and the like, based on the physical configuration of the smart processing device. Accordingly, in at least some arrangements, the different configurations provide more functionality control than merely activating or enabling a device for use in one configuration and disabling it in another. Rather, particular functions, limits, and the like, may be controlled using different configurations that go beyond merely turning a device on or off. Further, the different configurations may enable different types of functions (e.g., types of transactions that may be processed, and the like), and/or limits to functions (e.g., amounts for which a transaction may be processed), as discussed more fully herein.

In some examples, each removable segment may include a logic unit that, when connected to the central segment may form an integrated circuit, thereby enabling the desired functionality based on the physical configuration in which the removable segments are connected to the central segment.

In some examples, a smart processing device, or two or more similarly configured devices, may be provided to different users. However, in some examples, only a limited number of users (e.g., fewer than all users) may be aware of the functionality provided in certain configurations. Accordingly, providing information about the configurations and associated functionality may be controlled in, for examples, situations in which an employer is providing a smart processing device to employees to process business expenses, gain access to particular areas of a building, or the like.

As discussed herein, the removable segments may be physically fragmented portions of the smart processing device, such that the device itself may be formed of a plurality of different pieces, rather than a single piece in conventional arrangements.

In some examples, removable segments may be used to authenticate a user of the smart processing device or may be used to authenticate a user to another user.

In some examples, two different configurations may be used to process an event. For instance, a first configuration may be used to authenticate a user and a second configuration may be used to provide the functionality necessary to process the event.

The above-described examples and arrangements are merely some example arrangements in which the systems described herein may be used. Various other arrangements employing aspects described herein may be used without departing from the invention.

Figure 8:
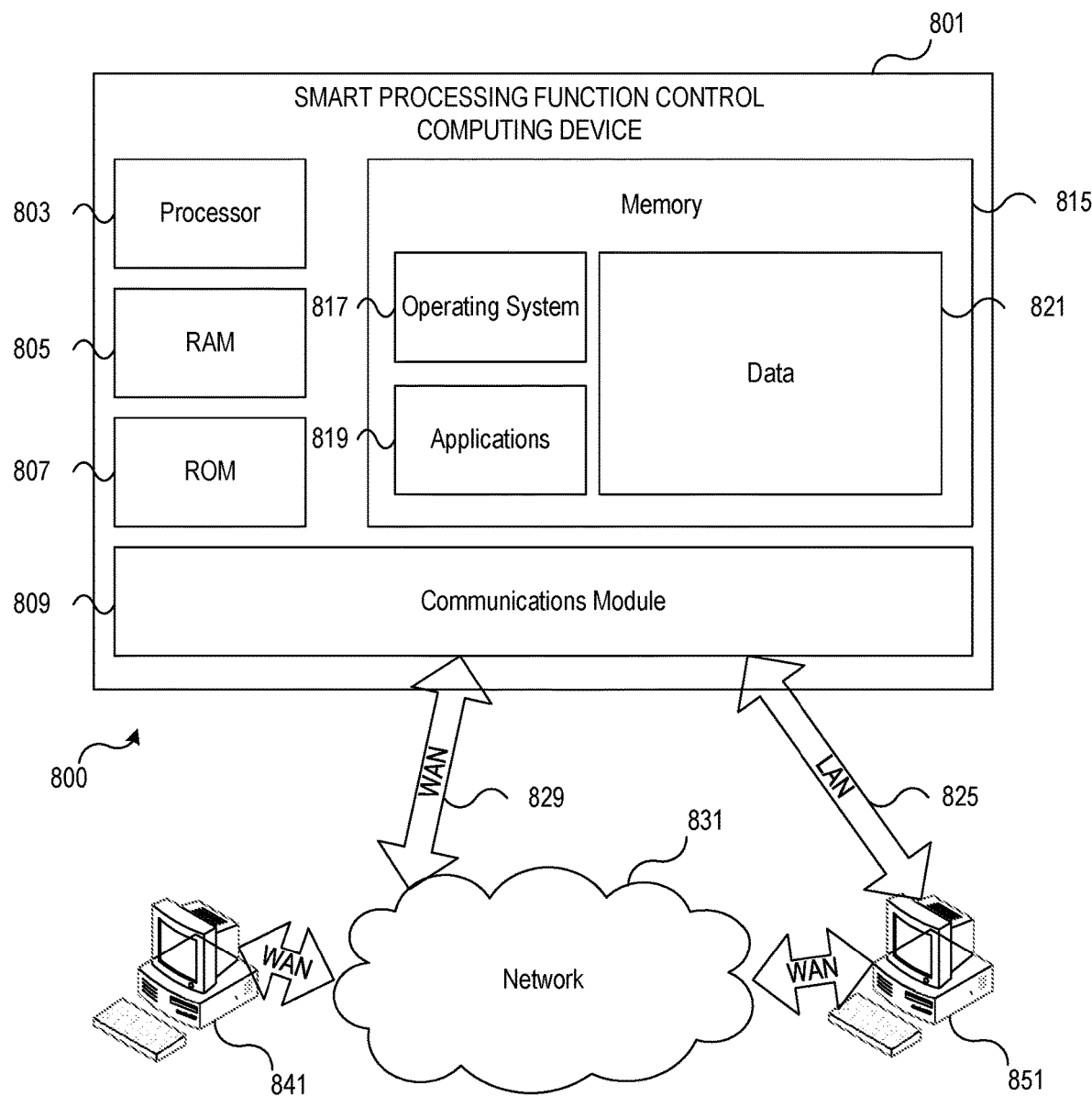
FIG. 8 illustrates one example operating environment in which various aspects of the disclosure may be implemented in accordance with one or more aspects described herein.

FIG. 8 depicts an illustrative operating environment in which various aspects of the present disclosure may be implemented in accordance with one or more example embodiments. Referring to FIG. 8, computing system environment 800 may be used according to one or more illustrative embodiments. Computing system environment 800 is only one example of a suitable computing environment and is not intended to suggest any limitation as to the scope of use or functionality contained in the disclosure. Computing system environment 800 should not be interpreted as having any dependency or requirement relating to any one or combination of components shown in illustrative computing system environment 800.

Computing system environment 800 may include smart processing function control computing device 801 having processor 803 for controlling overall operation of smart processing function control computing device 801 and its associated components, including Random Access Memory (RAM) 805, Read-Only Memory (ROM) 807, communications module 809, and memory 815. Smart processing function control computing device 801 may include a variety of computer readable media. Computer readable media may be any available media that may be accessed by smart processing function control computing device 801, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 801.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on smart processing function control computing device 801. Such a processor may execute computer-executable instructions stored on a computer-readable medium.

Software may be stored within memory 815 and/or storage to provide instructions to processor 803 for enabling smart processing function control computing device 801 to perform various functions as discussed herein. For example, memory 815 may store software used by smart processing function control computing device 801, such as operating system 817, application programs 819, and associated database 821. Also, some or all of the computer executable instructions for smart processing function control computing device 801 may be embodied in hardware or firmware. Although not shown, RAM 805 may include one or more applications representing the application data stored in RAM 805 while smart processing function control computing device 801 is on and corresponding software applications (e.g., software tasks) are running on smart processing function control computing device 801.

Communications module 809 may include a microphone, keypad, touch screen, and/or stylus through which a user of smart processing function control computing device 801 may provide input, and may also include one or more of a speaker for providing audio output and a video display device for providing textual, audiovisual and/or graphical output. Computing system environment 800 may also include optical scanners (not shown).

Smart processing function control computing device 801 may operate in a networked environment supporting connections to one or more remote computing devices, such as computing devices 841 and 851. Computing devices 841 and 851 may be personal computing devices or servers that include any or all of the elements described above relative to smart processing function control computing device 801.

The network connections depicted in FIG. 8 may include Local Area Network (LAN) 825 and Wide Area Network (WAN) 829, as well as other networks. When used in a LAN networking environment, smart processing function control computing device 801 may be connected to LAN 825 through a network interface or adapter in communications module 809. When used in a WAN networking environment, smart processing function control computing device 801 may include a modem in communications module 809 or other means for establishing communications over WAN 829, such as network 831 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 9:
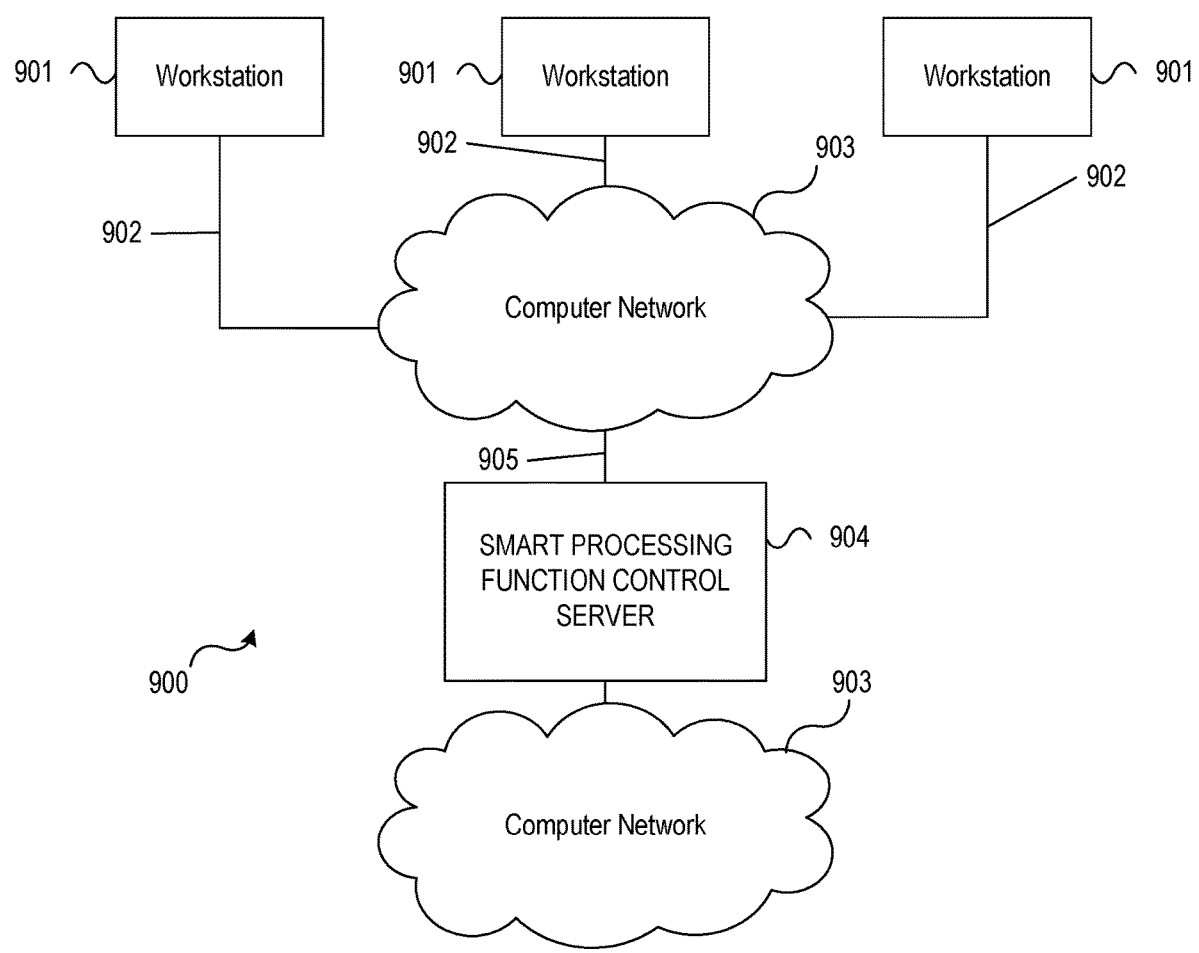
FIG. 9 depicts an illustrative block diagram of workstations and servers that may be used to implement the processes and functions of certain aspects of the present disclosure in accordance with one or more aspects described herein.

FIG. 9 depicts an illustrative block diagram of workstations and servers that may be used to implement the processes and functions of certain aspects of the present disclosure in accordance with one or more example embodiments. Referring to FIG. 9, illustrative system 900 may be used for implementing example embodiments according to the present disclosure. As illustrated, system 900 may include one or more workstation computers 901. Workstation 901 may be, for example, a desktop computer, a smartphone, a wireless device, a tablet computer, a laptop computer, and the like, configured to perform various processes described herein. Workstations 901 may be local or remote, and may be connected by one of communications links 902 to computer network 903 that is linked via communications link 905 to smart processing function control server 904. In system 900, smart processing function control server 904 may be a server, processor, computer, or data processing device, or combination of the same, configured to perform the functions and/or processes described herein. Server 904 may be used to receive requests to process events, receive physical configuration data associated with a smart processing device, evaluate configuration data to identify one or more functions to be enabled or disabled, generate and transmit signals enabling or disabling functions, and the like.

Computer network 903 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 902 and 905 may be communications links suitable for communicating between workstations 901 and smart processing function control server 904, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A smart processing device, comprising:
a central segment, the central segment having a generally planar surface and including a plurality of receiving areas; and
a plurality of removable segments, wherein each removable segment of the plurality of removable segments is configured to be removably connected to any receiving area of the plurality of receiving areas of the central segment,
wherein connection of the plurality of removable segments to the central segment in a first physical configuration enables first functionality of the smart processing device, and
wherein connection of the plurality of removable segment into the central segment in a second physical configuration different from the first physical configuration enables second functionality of the smart processing device, the second functionality being different from the first functionality.

2. The smart processing device of claim 1, wherein the plurality of removable segments includes four segments.

3. The smart processing device of claim 2, wherein the plurality of receiving areas of the central segment are arranged in corner areas of the central segment.

4. The smart processing device of claim 3, wherein the smart processing device has a generally rectangular shape when the plurality of removable segments is received in the plurality of receiving areas.

5. The smart processing device of claim 1, wherein enabling the second functionality includes disabling at least one function associated with the first functionality.

6. The smart processing device of claim 1, wherein the plurality of removable segments is configured to be connected to the central segment in a plurality of different configurations.

7. The smart processing device of claim 6, wherein at least one configuration of the plurality of different configurations includes disabling all functionality of the smart processing device.

8. A computing platform, comprising:
at least one processor;
a communication interface communicatively coupled to the at least one processor; and
memory storing computer-readable instructions that, when executed by the at least one processor, cause the computing platform to:
receive data associated with a first physical configuration of a smart processing device, wherein the first physical configuration includes a first arrangement of a plurality of removable segments relative to a central segment of the smart processing device;
compare the data associated with the first physical configuration of the smart processing device to pre-stored configuration data to identify a pre-stored configuration matching the first physical configuration;
identify, based on the pre-stored configuration matching the first physical configuration, one or more functions of the smart processing device to be enabled;
generate an instruction enabling the identified one or more functions; and
transmit the instruction enabling the identified one or more functions;
receive data associated with a second physical configuration of the smart processing device;
compare the data associated with the second physical configuration of the smart processing device to pre-stored configuration data to identify a pre-stored configuration matching the second physical configuration;
identify, based on the pre-stored configuration matching the second physical configuration, one or more functions of the smart processing device to be enabled and one or more previously enabled functions of the smart processing device to be disabled;
generate an instruction enabling the identified one or more functions and disabling the identified one or more functions; and
transmit the instruction enabling the identified one or more functions and disabling the identified one or more functions.

9. The computing platform of claim 8, wherein the removable segments are connected to the central segment of the smart processing device via a plurality of receiving areas of the central segment of the smart processing device.

10. The computing platform of claim 8, wherein the second physical configuration includes a second arrangement of the plurality of removable segments relative to the central segment of the smart processing device, the second arrangement being different from the first arrangement.

11. The computing platform of claim 8, wherein the one or more previously enabled functions include functions identified to be enabled based on the pre-stored configuration matching the first physical configuration.

12. The computing platform of claim 8, wherein the pre-stored configuration data includes a plurality of configurations and associated functions to be enabled or disabled.

13. A method, comprising:
receiving a plurality of removable segments by a plurality of receiving areas of a central segment of a smart processing device in a first physical configuration;
by a computing platform comprising at least one processor, memory, and a communication interface:
receiving, by the at least one processor and via the communication interface, data associated with a first physical configuration of the smart processing device;
comparing, by the at least one processor, the data associated with the first physical configuration of the smart processing device to pre-stored configuration data to identify a pre-stored configuration matching the first physical configuration;

identifying, by the at least one processor and based on the pre-stored configuration matching the first physical configuration, a first plurality of functions of the smart processing device to be enabled;

generating, by the at least one processor, an instruction enabling the identified first plurality of functions; and transmitting, by the at least one processor, the instruction enabling the identified first plurality functions;

after receiving the plurality of removable segments by the plurality of receiving areas of the central segment of the smart processing device in the first physical configuration, receiving the plurality of removable segments by the plurality of receiving areas of the central segment of the smart processing device in a second physical configuration different from the first physical configuration;

responsive to receiving the plurality of removable segments by the plurality of receiving areas of the central segment of the smart processing device in the second physical configuration, and by the computing platform;

receiving, by the at least one processor and via the communication interface, data associated with the second physical configuration of the smart processing device;

comparing, by the at least one processor, the data associated with the second physical configuration of the smart processing device to pre-stored configuration data to identify a pre-stored configuration matching the second physical configuration;

identifying, by the at least one processor and based on the pre-stored configuration matching the second physical configuration, a second plurality of functions of the smart processing device to be enabled and one or more previously enabled functions of the first plurality of functions of the smart processing device to be disabled;

generating, by the at least one processor, an instruction enabling the identified second plurality of functions to be enabled and disabling the identified one or more previously enabled functions of the first plurality of functions of the smart processing device to be disabled; and transmitting, by the at least one processor, the instruction enabling the identified second plurality of functions to be enabled and disabling the identified one or more previously enabled functions of the first plurality of functions of the smart processing device to be disabled.

14. The method of claim 13, wherein the first physical configuration includes a first arrangement of the plurality of removable segments relative to the central segment of the smart processing device.

15. The method of claim 14, wherein the plurality of receiving areas are located in corner areas of the central segment of the smart processing device.

16. The method of claim 13, wherein the one or more previously enabled functions include functions identified to be enabled based on the pre-stored configuration matching the first physical configuration.

17. The method of claim 13, wherein the pre-stored configuration data includes a plurality of configurations and associated functions to be enabled or disabled.

* * * * *

UNITED STATES PATENT AND TRADEMARK OFFICE
CERTIFICATE OF CORRECTION

Page 1 of 1

PATENT NO.        : 10,828,926 B2
APPLICATION NO.   : 16/210391
DATED             : November 10, 2020
INVENTOR(S)       : Kurian It is certified that error appears in the above-identified patent and that said Letters Patent is hereby corrected as shown below:

In the Claims

Column 21, Line 21:
In Claim 13, delete "platform;" and insert --platform:--

Signed and Sealed this
Twenty-seventh Day of April, 2021

Drew Hirshfeld
*Performing the Functions and Duties of the
Under Secretary of Commerce for Intellectual Property and
Director of the United States Patent and Trademark Office*